(No Model.) 2 Sheets—Sheet 1.

J. E. BLACKMORE.
ROLL HOLDING FLASH LIGHT CAMERA.

No. 590,204. Patented Sept. 21, 1897.

Attest:
L. Lee,
Edw. J. Kinsey

Inventor.
James E. Blackmore, per
Thomas S. Crane, Atty.

(No Model.) 2 Sheets—Sheet 2.

J. E. BLACKMORE.
ROLL HOLDING FLASH LIGHT CAMERA.

No. 590,204. Patented Sept. 21, 1897.

Attest:
L. Lee,
Edw. F. Kinsey.

Inventor
James E. Blackmore,
per Thomas S. Crane, Atty.

United States Patent Office.

JAMES EDWARD BLACKMORE, OF NEWARK, NEW JERSEY.

ROLL-HOLDING FLASH-LIGHT CAMERA.

SPECIFICATION forming part of Letters Patent No. 590,204, dated September 21, 1897.

Application filed March 23, 1897. Serial No. 628,891. (No model.)

*To all whom it may concern:*

Be it known that I, JAMES EDWARD BLACKMORE, a citizen of the United States, residing at Newark, county of Essex, State of New Jersey, have invented certain new and useful Improvements in Cameras Supplying their Own Light, fully described and represented in the following specification and the accompanying drawings, forming a part of the same.

The present invention relates particularly to the combination of a camera with a flash-light pistol in such manner that the handle or butt of the pistol may serve to support the camera when taking a picture and to direct it toward the desired object.

In such construction I use a pistol having a revolving barrel with the usual series of chambers to retain the cartridges; but the chambers are formed with lateral outlets to discharge the flash above the camera, and such flash is directed through a flaring nozzle upon the frame of the pistol to spread the flash laterally.

The hammer of the pistol, which is always cocked before firing, may be connected with a film-shifting device, so as to present a new film at each actuation of the pistol, and the hammer-detent may also be connected with the shutter-stop, so as to release the shutter and expose the film when the trigger presses upon such detent to fire the pistol.

The pistol is preferably made to be readily detached from the camera to facilitate the cleaning and refilling of the cartridge-chamber, and in such case the construction is provided with detachable connections to the film-shifting device and the shutter-stop to permit the detachment of the pistol.

To conceal the pistol from observation, the camera-box may be provided with an extension adapted to inclose the entire pistol and provided with a door for exposing the handle of the pistol when necessary.

These improvements will be understood by reference to the annexed drawings, in which—

Figure 1:
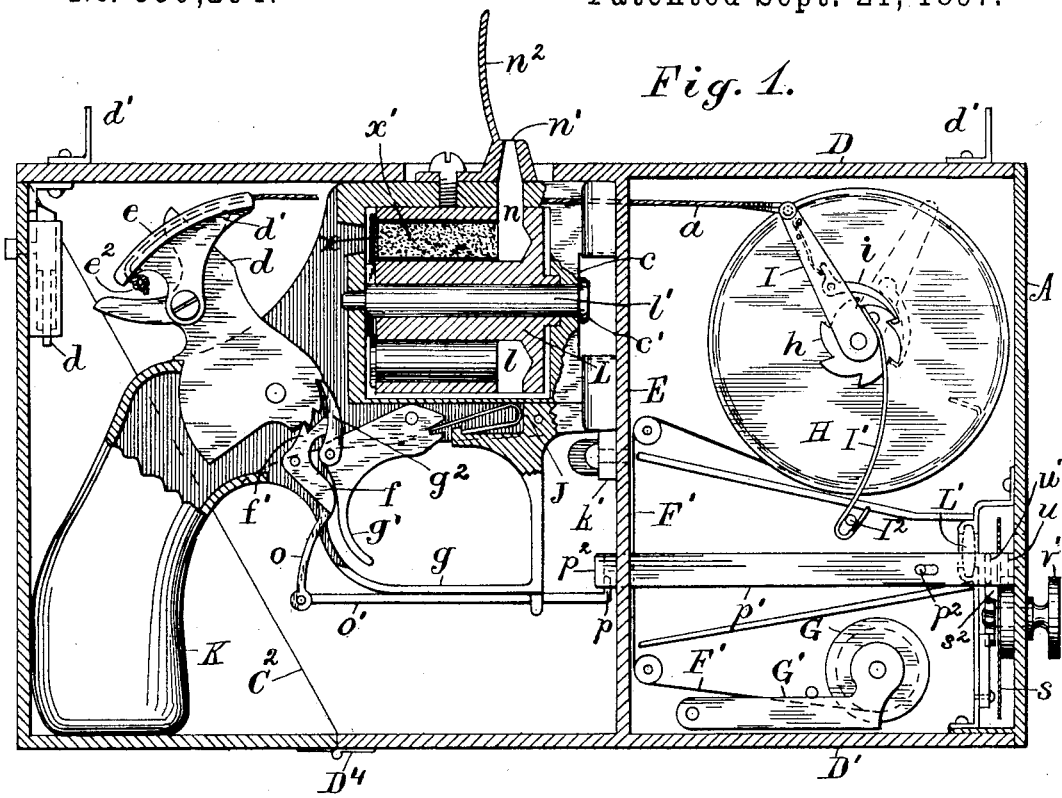
Figure 2:
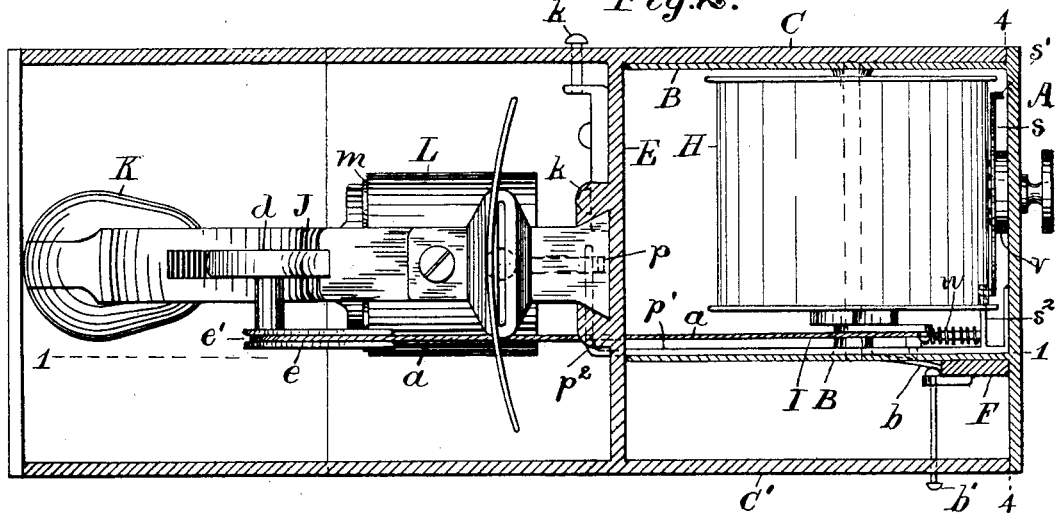
Figure 3:
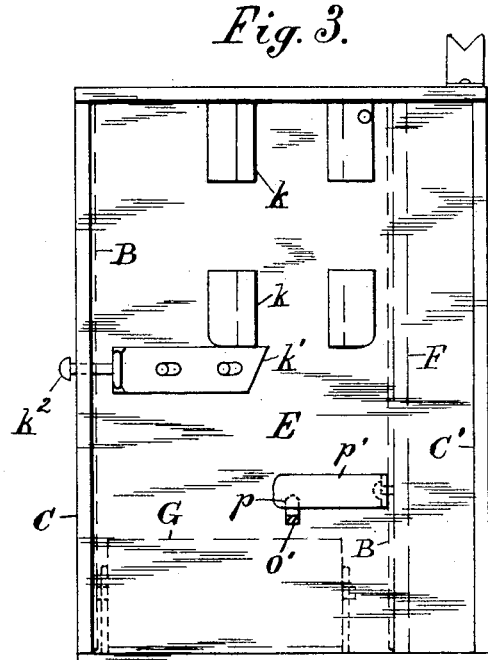
Figure 4:
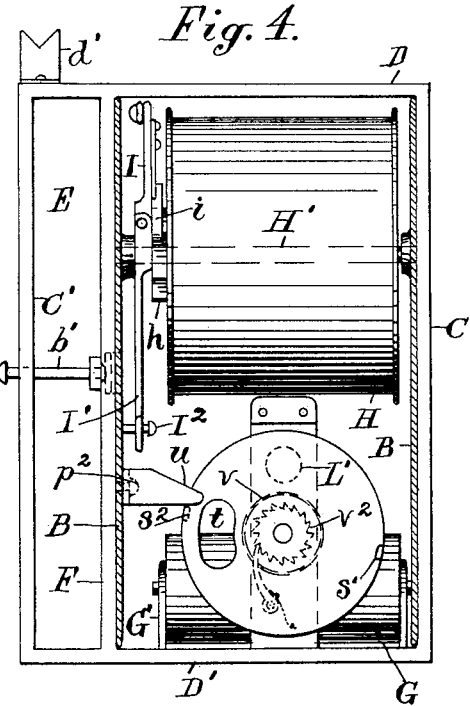
Figure 5:
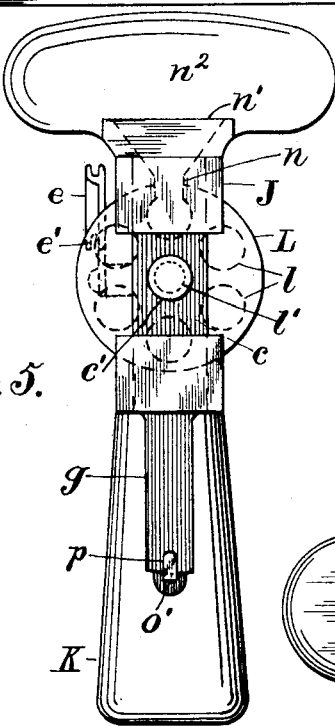
Figure 7:
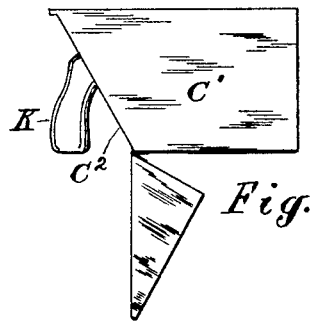
Figure 6:
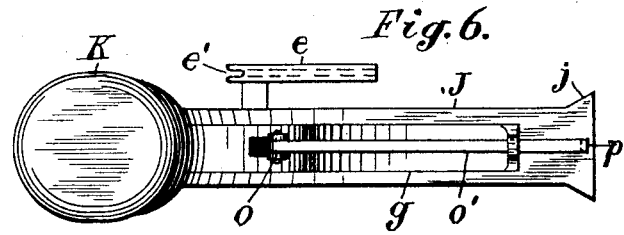

Figure 1 is a side elevation of the apparatus, taken on line 1 1 in Fig. 2, with the nearer side of the camera-frame removed and the pistol-barrel shown in section at the center line, with a portion of the pistol-frame in section upon the center line of the barrel, as well as the flash-light nozzle and reflector. Fig. 2 is a plan of the apparatus with the top of the box or casing entirely broken away to expose the parts beneath. Fig. 3 is a rear elevation of the casing with the pistol removed. Fig. 4 is a front elevation of the casing with the front end entirely broken away upon line 4 4 in Fig. 2. Fig. 5 is a front elevation of the pistol detached from the apparatus. Fig. 6 shows the under side of the pistol; and Fig. 7 is a side elevation, upon reduced scale, of the casing with rear door open to expose the butt of the pistol.

The camera-frame is shown formed with a front plate A and two side plates B, adapted to fit detachably within the dark chamber formed in the front end of the casing. The casing is formed with sides C C', top D, and bottom D' and has a transverse partition E to form the rear of the dark chamber.

A post F is inserted between the top and bottom at the front end, and a tongue $b$, cut from one of the camera sides B, is constructed to spring behind said post to lock the camera within the casing. A push-pin $b'$ is provided to detach the tongue $b$ from the post F when required to withdraw the camera from the casing to change the film. The roll of film is indicated at G, pivoted in the ordinary swing-frame G', and a reel H is shown pivoted between the sides B to draw the film from the roll G. A ratchet-wheel $h$ is attached to the reel and an arm I, provided with a spring-pawl $i$, is pivoted upon the axle H' of the wheel and a connecting-cord $a$ extended from such arm through the partition E.

The casing is extended in the rear of the partition E to inclose the pistol, and the front end of the pistol-frame J is formed with vertical dovetails $j$ to engage ribs $k$ upon the partition E. A latch $k'$, Figs. 1, 2, and 3, is fitted beneath the ribs $k$ to hold the dovetails locked therein. The dovetails and ribs are divided at the middle of their length by a notch $c$ to facilitate the detachment of the pistol from the camera by a short downward movement, the upper ends of the dovetails being drawn outwardly through the notch when the dovetails have been moved about one-third of their length.

The sides of the casing are shown divided near the rear end upon an oblique line $C^2$, and the bottom D is shown jointed by hinge $D^4$, and the rear end of the casing thus forms a door which is adapted to swing downwardly, as shown in Fig. 7, to expose the butt of the pistol K. A sliding gate $d$ is provided to latch the door when closed, and sights $d'$ are shown upon the top of the casing to aline the same with any particular object when it is desired to use the apparatus by daylight.

The cartridge-barrel is provided with chambers $l$, which are preferably closed at the outer end and formed each with a lateral outlet $n$ near such end.

A perforation is formed through the top of the pistol-frame with which the outlets $n$ are successively registered as the barrel is turned, and a flaring nozzle $n'$ and reflector $n^2$ are attached to the frame above such perforation.

The pivot-pin $l'$ of the cartridge-barrel is formed with a collar $c'$ to withdraw the pin when it is necessary to detach the cartridge-barrel from the pistol for cleaning.

A detachable connection between the pistol and the film-shifting mechanism is formed as follows: The hammer $d$ (formed with the ordinary firing-pin $d'$) is provided with a grooved segment $e$, which is attached to the side of the hammer and formed with a slot $e'$ at its rear end to engage a knot upon the end of the cord $a$. A spring $I'$, which is attached to the arm I and presses upon a stationary pin $I^2$ upon one of the camera-plates B, (see Fig. 4,) serves to hold the cord under tension and to move the pawl $i$ forward automatically, and the cord is readily detached from the segment $e$ by slipping the knot $e^2$ out of the slot $e'$ when it is desired to detach the pistol from the camera.

The hammer is shown cocked in Fig. 1, and the film-shifting mechanism, comprising the arm I and ratchet attachment, is shown in full lines in a corresponding position. In Fig. 2 the hammer is shown down and the ratchet mechanism in a reverse position to that shown in Fig. 1, the arm I and pawl $i$ being shown in dotted lines in Fig. 1 in the same position as in Fig. 2 and moved forward to reëngage the teeth of the wheel $h$, so as to feed the film forward when the hammer is cocked.

A self-cocking pistol is shown, in which the trigger $g'$ is connected with the hammer by pawl $g^2$ to cock the hammer automatically.

$f'$ is the detent which holds the hammer cocked and which is provided with a stud $f$, projecting within the trigger-guard $g$ to be pressed by the trigger in firing the pistol.

The shutter-stop is actuated by the hammer-detent as follows: A finger $o$ is projected from the trigger detent-stud $f$ and connected by a rod $o'$ and hook $p$ with a slide $p'$, which carries the shutter-stop. A rotatable shutter $s$ is pivoted between the front plate A and the lens $L'$, Figs. 1 and 4, and is provided with a spring-barrel $b$ and with a rotary spindle for winding the spring. The spindle is provided upon its outer end with a button $b'$ to turn the same and upon its inner end with ratchet-wheel $b^2$, as is common. The shutter is formed with an opening $t$ and with studs $s'$ and $s^2$, projected, respectively, from the front and rear sides of the shutter-disk at opposite sides of its center, and when such studs are released from the shutter-stop the disk is rotated by the spring in the usual manner. The slide $p'$ is provided with toes $u$ and $u'$, which project upon opposite sides of the disk near one edge to engage alternately the studs $s'$ and $s^2$ and are thus adapted to arrest such studs in opposite positions of the slide. The stud $s^2$ is shown engaged with the toe $u'$, and the rear end of the slide is formed with an arm $p^2$, which projects past the hook $p$ upon the rod $o$. (See Figs. 1 and 2.) The arm $p^2$ is so arranged that when the dovetails upon the pistol-frame are slid between the ribs $k$ the hook engages the arm, so that the slide is retracted when the stud $f$ is pressed by the trigger. The retraction of the slide withdraws the toe $u'$ from the stud $s^2$ and permits the shutter to revolve one-half a revolution, until the stud $s'$ is arrested by the toe $u$. When the pressure upon the trigger is removed, the slide is pressed forward by a spring $w$, (see Fig. 2,) thus releasing the stud $s'$ from the stop and permitting the rotation of the shutter until the stud $s^2$ is arrested, which sets the shutter in its initial position.

In Fig. 1 the side plate B of the camera-frame is removed contiguous to the outer side of the slide, and the screw $p^3$, which is shown fitted to a slot in the slide to guide the same adjacent to the shutter, would be supported upon the plate B, as shown in Fig. 4. The hook $p$ and arm $p^2$ form a completely-detachable connection between the pistol and the shutter-stop.

Two cartridges are shown in the cartridge-barrel L, the upper one being in section to show the fulminate $x$ at the outer end of the cartridge, where it may be exploded by the firing-pin $d'$, the body of the shell being filled with the flash-light powder $x'$, which is exploded by the fulminate and discharges upwardly through the nozzle $n'$.

It will be observed that while the nozzle is expanded laterally, as shown in Figs. 2 and 5, it is contracted in the other direction, as is clearly shown in Fig. 1, to force the gases and burning powder laterally, and it is therefore necessary to retain the flash-light powder in the cartridge by some substance that will not choke up the narrow slit in the nozzle.

For use with the camera, as shown herein, it is preferable to have the chambers in the cartridge-barrel closed at their outer ends and provided with lateral outlets, so that the flash may be discharged from the upper side of the pistol-frame.

The present improvements furnish a most efficient means of producing a flash-light and of repeating the same by firing the pistol repeatedly, and they also furnish a camera carrying its own light, as the pistol furnishes the means of directing the camera toward the desired object and also of producing the flash.

Having thus set forth the nature of my invention, what I claim herein is—

1. A photographing apparatus comprising a camera provided with a shutter, a chamber containing a charge of flash-light powder, and means connected with such shutter and chamber for simultaneously opening the shutter and exploding the powder, substantially as set forth.

2. A photographing apparatus comprising a camera provided with a movable film and a shutter for exposing the same, a chamber containing a charge of flash-light powder, a hammer for exploding the same, means connected with the hammer and film for actuating both simultaneously, and means connected with the said shutter and chamber for simultaneously exploding the powder and opening the shutter, substantially as set forth.

3. The combination, with a camera, of a pistol adapted to support the camera, and having connection with the shutter-stop to open the shutter when the pistol is fired, substantially as herein set forth.

4. The combination, with a camera having a film, a reel to wind the same, and mechanism for turning the reel, of a pistol adapted to support the camera, and having connection with the reel-turning mechanism to shift the film before the pistol is discharged, substantially as herein set forth.

5. The combination, with a camera having a film with a reel to wind the same, and a lever with pawl and ratchet for turning the reel, of a pistol attached to the camera and having its hammer connected with such lever, to shift the film when the hammer is cocked, as and for the purpose set forth.

6. A camera having a film, a reel to wind the same, with mechanism for rotating the reel, and a shutter with stop for holding the same, in combination with a pistol having a connection from the hammer to the reel-winding mechanism, and a connection from the hammer-detent of the pistol to the shutter-stop, whereby the film is shifted when the hammer is cocked, and the shutter is released when the pistol is fired, substantially as herein set forth.

7. The combination, with a camera having a film with a reel to wind the same and a ratchet for turning such reel, of a pistol adapted to support the camera, and having a segment attached to the side of the hammer, with cord connecting such segment with the ratchet mechanism for turning the reel, substantially as herein set forth.

8. The combination, with a camera having a film with a reel to wind the same and a ratchet for turning such reel, of a pistol adapted to support the camera, and having a detachable connection between its hammer and the ratchet mechanism for turning the reel, to permit the detachment of the pistol from the camera, substantially as herein set forth.

9. A camera having a film, a reel to wind the same with mechanism for rotating the reel, and a shutter with stop for holding the same, in combination with a pistol having a detachable connection from its hammer to the reel-winding mechanism, and a detachable connection from the hammer-detent of the pistol to the shutter-stop, as and for the purpose set forth.

10. The combination, with a camera, of a flash-light pistol having a rotary barrel containing a series of chambers, with lateral outlet from each chamber to discharge the flash laterally, substantially as herein set forth.

11. The combination, with a camera, of a flash-light pistol having a rotary barrel containing a series of chambers, with lateral outlet for each chamber, and a flaring nozzle upon the pistol-frame to register with such lateral outlets and spread the flash, substantially as herein set forth.

12. The combination, with a camera, of a flash-light pistol attached to the same, and an extension of the camera-box to conceal the said pistol, substantially as herein set forth.

13. The combination, with a camera, of a flash-light pistol attached to the same, and an extension of the camera-box to conceal the said pistol, with a door in such extension for exposing the handle of the pistol, substantially as herein set forth.

14. The combination, with a camera, of a flash-light pistol attached to the same, and an extension of the camera-box to conceal the said pistol, with the rear of such extension divided obliquely and hinged thereto for exposing the handle of the pistol, substantially as herein set forth.

15. A flash-light pistol having a rotary barrel containing a series of chambers, a flaring nozzle upon the pistol-frame, and an outlet from each of said chambers adapted to register in turn with the flaring nozzle, to spread the flash when the charge in each of said chambers is exploded, substantially as herein set forth.

In testimony whereof I have hereunto set my hand in the presence of two subscribing witnesses.

JAMES EDWARD BLACKMORE.

Witnesses:
FRANK G. SCHAEFFER,
THOMAS S. CRANE.